United States Patent
Estevez et al.

(10) Patent No.: US 8,174,611 B2
(45) Date of Patent: May 8, 2012

(54) DIGITAL IMAGE SEGMENTATION USING FLASH

(75) Inventors: Leonardo William Estevez, Rowlett, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 12/412,221

(22) Filed: Mar. 26, 2009

(65) Prior Publication Data
US 2010/0245609 A1 Sep. 30, 2010

(51) Int. Cl.
H04N 5/222 (2006.01)
H04N 5/228 (2006.01)
H04N 5/235 (2006.01)
G06K 9/00 (2006.01)
G06K 9/38 (2006.01)
G06K 9/56 (2006.01)
G03B 15/03 (2006.01)

(52) U.S. Cl. ............ 348/371; 348/370; 348/222.1; 348/362; 348/296; 382/164; 382/172; 382/308; 382/171; 396/171

(58) Field of Classification Search .......... 348/371, 348/370, 221.1, 222.1, 68, 131, 132, 258, 348/296, 362; 382/164, 171, 173, 172, 308; 396/171, 173, 176, 177
See application file for complete search history.

(56) References Cited

U.S. PATENT DOCUMENTS

| | | | | |
|---|---|---|---|---|
| 6,366,316 | B1* | 4/2002 | Parulski et al. | 348/239 |
| 6,556,704 | B1* | 4/2003 | Chen | 382/154 |
| 7,024,054 | B2* | 4/2006 | Cahill et al. | 382/294 |
| 7,796,822 | B2* | 9/2010 | Steinberg et al. | 382/224 |
| 2006/0008171 | A1* | 1/2006 | Petschnigg et al. | 382/254 |
| 2006/0039690 | A1* | 2/2006 | Steinberg et al. | 396/155 |
| 2006/0132642 | A1* | 6/2006 | Hosaka et al. | 348/370 |
| 2006/0285754 | A1* | 12/2006 | Steinberg et al. | 382/224 |
| 2007/0025717 | A1* | 2/2007 | Raskar et al. | 396/155 |
| 2007/0177805 | A1* | 8/2007 | Gallagher | 382/190 |

* cited by examiner

Primary Examiner — Lin Ye
Assistant Examiner — Marly Camargo
(74) Attorney, Agent, or Firm — Ronald O. Neerings; Wade James Brady, III; Frederick J. Telecky, Jr.

(57) ABSTRACT

A digital camera function, such as can be implemented in a cellular telephone handset, and that includes automated segmentation of foreground subjects in acquired digital photos and images. Successive images are captured by the digital camera function at different flash exposure levels, for example using existing light only and using flash exposure. After alignment and registration of the images, luminance difference values in the two images are determined for each pixel, and the luminance difference values compared against a threshold value on a pixel-by-pixel basis. Those pixels with luminance difference values exceeding the threshold are segmented from the image as foreground subjects.

22 Claims, 5 Drawing Sheets

DIGITAL IMAGE SEGMENTATION USING FLASH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of digital image processing, and is more specifically directed to the segmentation of a digital image to distinguish foreground and background subjects.

Digital cameras have now become commonplace in modern society, especially with the implementation of digital cameras in cellular telephone handsets. As is fundamental in the art, the digitization of a captured photographic image allows the image to be analyzed and processed by digital image processing techniques. Conventional digital image processing algorithms range from basic image "improvement" processing to optimize exposure, color saturation, and sharpness in the image, to the wholesale alteration of image subjects and of the image itself.

In digital image processing, the operation of segmentation refers to the analysis of a digital image to identify features or subjects in the image, and to extract those features or subjects from the image. In a general sense, segmentation partitions the digital image into a set of segments, where the pixels within a given segment have some similarity to one another in color, intensity, texture, etc., at least in a relative sense as compared with pixels in adjacent segments. Conventional image processing techniques used for segmentation of a digital image include "clustering" by way of an iterative statistical algorithm, analysis of the image based on a histogram of color or intensity (i.e., identifying pixels in a peak or valley of the histogram), edge detection algorithms, and similarity determination relative to neighboring pixels according to "region growing" methods, among others. Some segmentation algorithms are quite complicated, for example involving the analysis of two- or three-dimensional entropy functions.

Three-dimensional effects in still and video image display are again gaining popularity. Modern techniques for displaying a "3D" image or sequence of images on a conventional "2D" video display all require distinguishing features or subjects of the image that are near to the camera or viewer, from those that are farther away. Differences in perspective, color, polarization, or phase (i.e., for interference filter technology) are applied differently to the near and far subjects, which are discernible by the viewer either directly, or by wearing special glasses. As such, the segmentation of a two-dimensional digital image is useful in identifying and extracting features or subjects of the image based on their distance from the camera.

BRIEF SUMMARY OF THE INVENTION

Embodiments of this invention provide a digital camera function, and method of operating the camera function, for performing segmentation of near objects in a captured image.

Embodiments of this invention provide such a camera function and method in which the segmentation can be performed automatically by the digital camera itself.

Embodiments of this invention provide such a camera function and method that can be carried out by digital cameras of relatively modest computational capability.

Embodiments of this invention provide such a camera function and method that can be easily adjusted by the digital camera user.

Embodiments of this invention can provide other objects and advantages of this invention that will be apparent to those of ordinary skill in the art having reference to the following specification together with its drawings.

This invention may be implemented into a digital camera with flash exposure capability, such as a digital camera within a cellular telephone handset. A digital image of the desired subjects is captured with flash exposure, and another image is captured with significantly less flash exposure or with no flash. The images are compared pixel-by-pixel to determine a difference in luminance for each pixel between the images. Those pixels with a higher luminance difference correspond to foreground pixels. The image segments corresponding to near features or subjects of the image can then be extracted by thresholding the luminance difference on a pixel-by-pixel basis.

DETAILED DESCRIPTION OF THE INVENTION

The present invention will be described in connection with one of its embodiments, namely as implemented into a digital camera function in a cellular telephone handset, as it is contemplated that this invention is especially beneficial when realized in such an application. However, other applications can also benefit from this invention, including digital still cameras of higher capability, larger-scale video acquisition and processing systems, and the like. It is contemplated that these and other uses of this invention will be apparent to those skilled in the art having reference to this specification. Accordingly, it is to be understood that the following description is provided by way of example only, and is not intended to limit the true scope of this invention as claimed.

Figure 1:
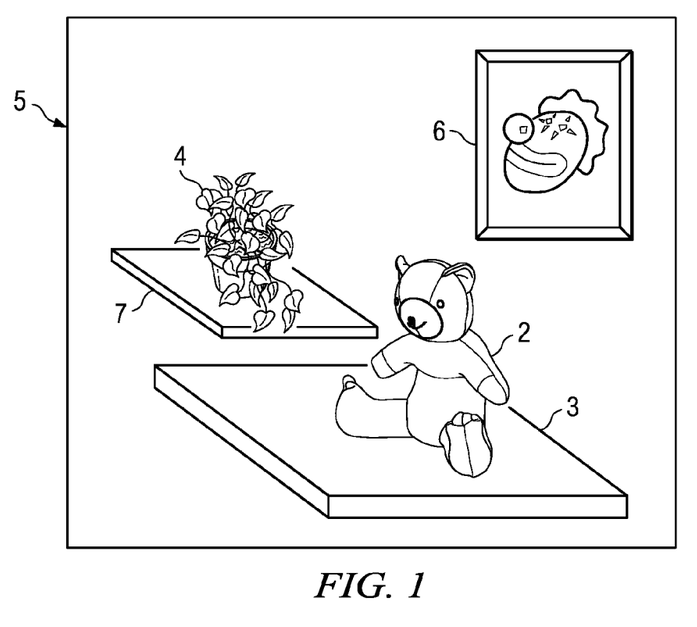
FIG. 1 is a view of a digital image to be acquired and segmented according to embodiments of the invention.

Embodiments of this invention are directed to capturing one or more digital images, either individually or in a video sequence, so that one or more foreground subjects can be identified in an image and separated or extracted from the background. Such identification and extraction is referred to in the art as "segmentation". Referring to FIG. 1, the function of embodiments of this invention will be described by way of an illustrative example.

FIG. 1 shows an example of a scene to be captured by a camera as a digital image. As shown in FIG. 1, toy 2 on shelf 3 is in the foreground of the scene, and is closest to the point of view of the camera (which is the point of view shown in FIG. 1). Flowerpot 4 on shelf 7 is at a middle distance ("midground") of the scene, and framed picture 6 is in the background, as hanging on a back wall of the scene farthest from the camera. In this example of embodiments of this invention, a digital image with field of view 5 is captured, and the foreground subject represented by toy 2 is identified as such, relative to midground flowerpot 4 and background framed picture 6. Segmentation of toy 2 can then readily be performed, according to embodiments of this invention, and processed as desired by the photographer or digital image processor. For example, the image of toy 2 can be inserted into other digital images, or a "3D" digital image can be created of the scene in FIG. 1 according to conventional processing.

According to embodiments of this invention, flash photography is used to distinguish subjects in the digital image from one another, based on distance from the camera. This concept will now be described with reference to FIGS. 2a and 2b.

Figure 2A:
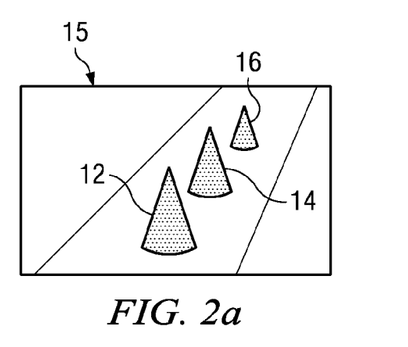
FIGS. 2a through 2c are examples of images acquired according to embodiments of the invention.

In FIG. 2a, a digital image with field of view 15 is shown, and includes subjects at varying distances from the camera. Cones 12, 14, 16 of FIG. 2a are of identical size as one another, but are at different distances from the point of view of the image (i.e., at different distances from the camera that is capturing the image). As such, cone 12 is a foreground subject of this digital image, cone 14 is a midground subject, and cone 16 is a background subject. FIG. 2a more specifically represents a digital image or photo that has been captured without the use of a flash on the camera, but rather using only the existing ambient light of the scene. For purposes of this description, cones 12, 14, 16 are all of the same color (in the black-and-white sense, at least), and as such all reflect light of the same intensity. In other words, the pixels representing cones 12, 14, 16 have equal luminance, in the digital image acquired without flash exposure (using existing light only).

As known in the art of photography, the intensity of light from a flash element falls off with the inverse of the square of the distance. For example, if cone 14 is at twice the distance from a camera than cone 12, cone 14 will be illuminated by a flash from the camera with one-fourth the light intensity of the flash illumination of cone 12. If cone 16 is at four times the distance from the camera as cone 12, it will be illuminated by one-sixteenth of the light intensity with which cone 12 is illuminated by flash from the camera.

Figure 2B:
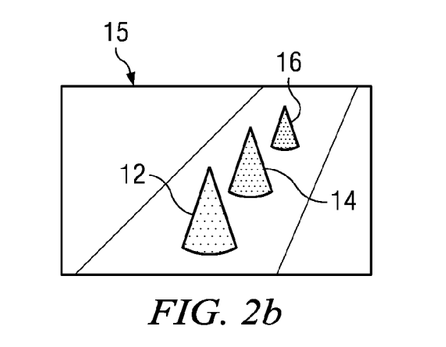

FIG. 2b illustrates, qualitatively, a digital image acquired of the same scene as in FIG. 2a, but using flash exposure. In this example, the exposure settings (lens f-stop and shutter speed) used to acquire the image of FIG. 2b are the same as used to acquire the image of FIG. 2a; the distance of the camera and the field of view 15 of the images of FIGS. 2a and 2b are also the same as one another. As evident from FIG. 2b, foreground cone 12 is substantially "brighter" than as represented in the existing-light image of FIG. 2a, while midground cone 14 is slightly brighter than its existing-light image. Background cone 16 is at about the same brightness in both images. This difference in brightness, or luminance, of corresponding pixels in the two images is thus based on the extent to which flash exposure illuminates the subjects in the image of FIG. 2b. And the difference in luminance among cones 12, 14, 16 relative to one another, in FIG. 2b, is due to the difference in their distances to the camera. Cone 14 is not as bright as cone 12 because it is farther from the flash, and cone 16 is not as bright as either of cones 12, 14 because it is the farthest from the flash. In this example, cone 16 is effectively at the same brightness (i.e., pixels representing cone 16 have the same luminance) in the image of FIG. 2b as in the image of FIG. 2a, because little or no light from the camera flash reached cone 16. In other words, the luminance of pixels representing cone 16 in the image of FIG. 2b is based essentially on the existing ambient light of the scene, and thus equals the luminance of these pixels in the image of FIG. 2a.

This inverse-square relationship of incident light to distance from the source is used to advantage in this invention. Given the relationship of detected luminance in the existing light and flash-exposed images of FIGS. 2a and 2b, it has been discovered, in connection with this invention, that one can distinguish foreground objects (e.g., cone 12) from background objects (e.g., cones 14 and 16) by analyzing the difference in luminance, pixel-by-pixel, between the two images. Those pixels having a large luminance difference represent subjects that are closer to the camera, while those with no more than a small luminance difference represent subjects that are farther away from the camera. Automated segmentation of foreground subjects in digital images can now be readily performed.

Figure 3:
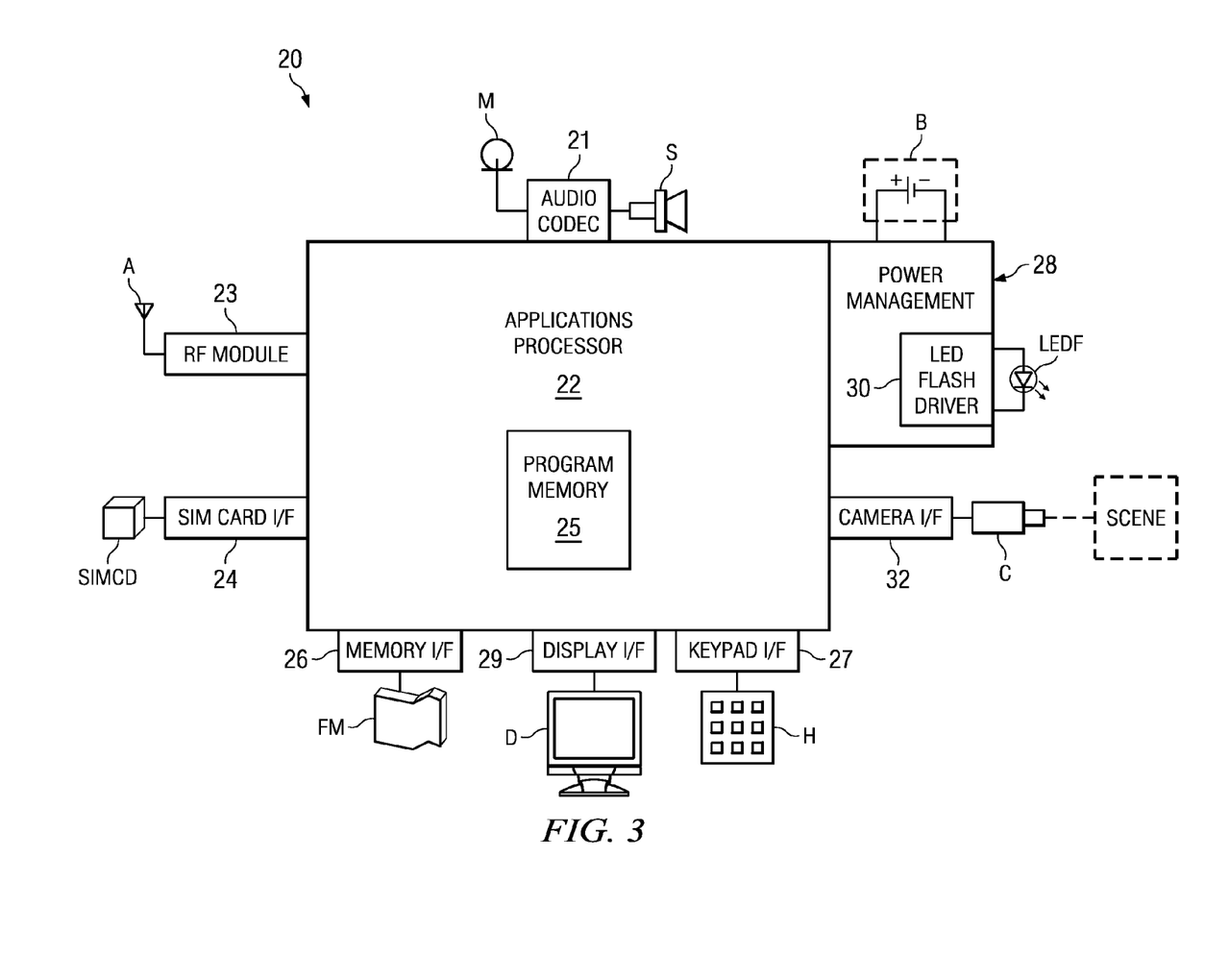
FIG. 3 is an electrical diagram, in block form, of a cellular telephone handset with digital camera functionality, constructed according to the invention.

Referring now to FIG. 3, the construction of an electronic system including a camera function will now be described by the example of camera-enabled cellular telephone handset ("camera phone") 20. In this example, the digital functionality controlling the operation of camera phone 20 is centered on applications processor 22, which is a conventional single or multiple processor core integrated circuit devices, such as one of the LOCOSTO, OMAP2xxx, OMAP3xxx, or OMAP4xxx applications processors available from Texas Instruments Incorporated. As known in the art, such applications processors are capable of managing cellular telephony from the client or handset side, and of implementing other ancillary functions including at least a digital camera function, and also possibly including data and multimedia wireless communications, audio and video playback, and the like. In this example, applications processor 22 includes program memory 25, which stores computer-executable instructions and software routines that, when executed by applications processor 22, carries out the functions involved in the operation of camera phone 20, including those functions involved in operating camera phone 20 according to embodiments of this invention. It is, of course, contemplated that program memory 25 may alternatively be realized in other ways besides within applications processor 22, for example by way of some memory resource external to the integrated circuit that realizes applications processor 22. It is also contemplated that applications processor 22 will contain or have access to a data memory resource (not shown), in which the results of its digital processing routines and functions are stored.

As shown in FIG. 3, camera phone 20 is realized by applications processor 22 in combination with various interface functions. Audio codec 21 manages the acquisition of audio input from microphone M and the communication of audio signals to applications processor 22 for eventual transmission over the wireless link, and also the output of audio output via speaker S based on signals from application processor 22 received over the wireless link. RF module 23 is coupled to applications processor 22 and to antenna A, and manages the modulation digital data processed by applications processor 22 and its transmission over the wireless link, as well as the receipt of wireless signals and the demodulation of those signals into data for processing by applications processor 22 and eventual storage or output. SIM card interface 24 provides a memory interface function between applications processor 22 and SIM card SIMCD, on which identification information and also user information such as phone numbers are stored, in the conventional manner. Memory interface 26 couples applications processor 22 to flash memory device FM, on which user data such as digital image files, audio files, video files, and the like may be stored. Display interface 29 provides the appropriate video interface between applications processor 22 and phone display D, on which telephone operating information, text messages, and video output (if enabled) are displayed to the user. Keypad interface 27 communicates user inputs entered via the keypad or keyboard H to applications processor 22. Alternatively, keypad H and display D may be implemented in combination as a touchscreen, as known in the art.

These interface and other functions may be realized in one or more separate integrated circuits from applications processor 22. Or alternatively, some or more of these functions may be implemented into a single integrated circuit along with applications processor 22, for example as in the case of the LOCOSTO applications processor and single-chip cellular handset solution available from Texas Instruments Incorporated.

Camera phone 20 includes a camera function, as mentioned above. As shown in FIG. 3, camera hardware C is coupled to applications processor 22 by way of camera interface 32. Camera hardware C implements a conventional phone camera, and as such includes a lens, a solid-state light sensor (e.g., charge-coupled-device), an electronic "shutter" that controls the duration over which the light sensor is active to capture an image, automatic exposure circuitry for determining this exposure duration based on sensed light from the scene, and other conventional circuitry and functionality for acquiring a digital image. Typically, the lens aperture is not adjusted in conventional camera phones; higher-capability digital cameras typically include automatic aperture control and manual aperture adjustment functions. In the example of camera phone 20 of FIG. 3, camera interface 32 includes the circuit functionality for retrieving pixel data from the sensor of camera hardware C, and for forwarding that pixel data to applications processor 22 for processing according to the embodiments of this invention. Camera interface 32 also includes the appropriate circuit functionality for controlling the sensor to capture an image ("take" a photograph), in response to a key of keypad H or to some other user input.

Camera phone 20 is powered from battery B, under the control and management of power management function 28. Power management function 28 may be realized as a separate integrated circuit (from applications processor 22) that controls and applies the appropriate system power from battery B to applications processor 22 and the other functions within camera phone 20, including the generation of such regulated voltages as necessary. Power management function 28, as typical in the art, also can include power savings functionality, such that activation or backlight of display D and similar non-essential functions can be turned off after a time-out period. Other functions that are commonly included within power management function 28, as in conventional cellular handsets, include control of a vibrating indicator, interface to an on/off switch, display of a remaining-battery-power indication, and the like. According to this embodiment of the invention, power management function 28 also includes LED flash driver 30, which is coupled to an LED-based camera flash LEDF to be fired as necessary in conjunction with taking a digital photo via camera hardware C. It is contemplated that LED flash driver 30 can apply sufficient power to camera flash LEDF to illuminate close-by photo subjects; if desired, applications processor 22 may operate to receive some indication of the available ambient light via camera hardware C and camera interface 32, and to control the output of camera flash LEDF under the control of LED flash driver 30. In any case, LED flash driver 30 and camera flash LEDF serve to provide camera phone 20 with the capability of flash photography, according to this embodiment of the invention.

Figure 4A:
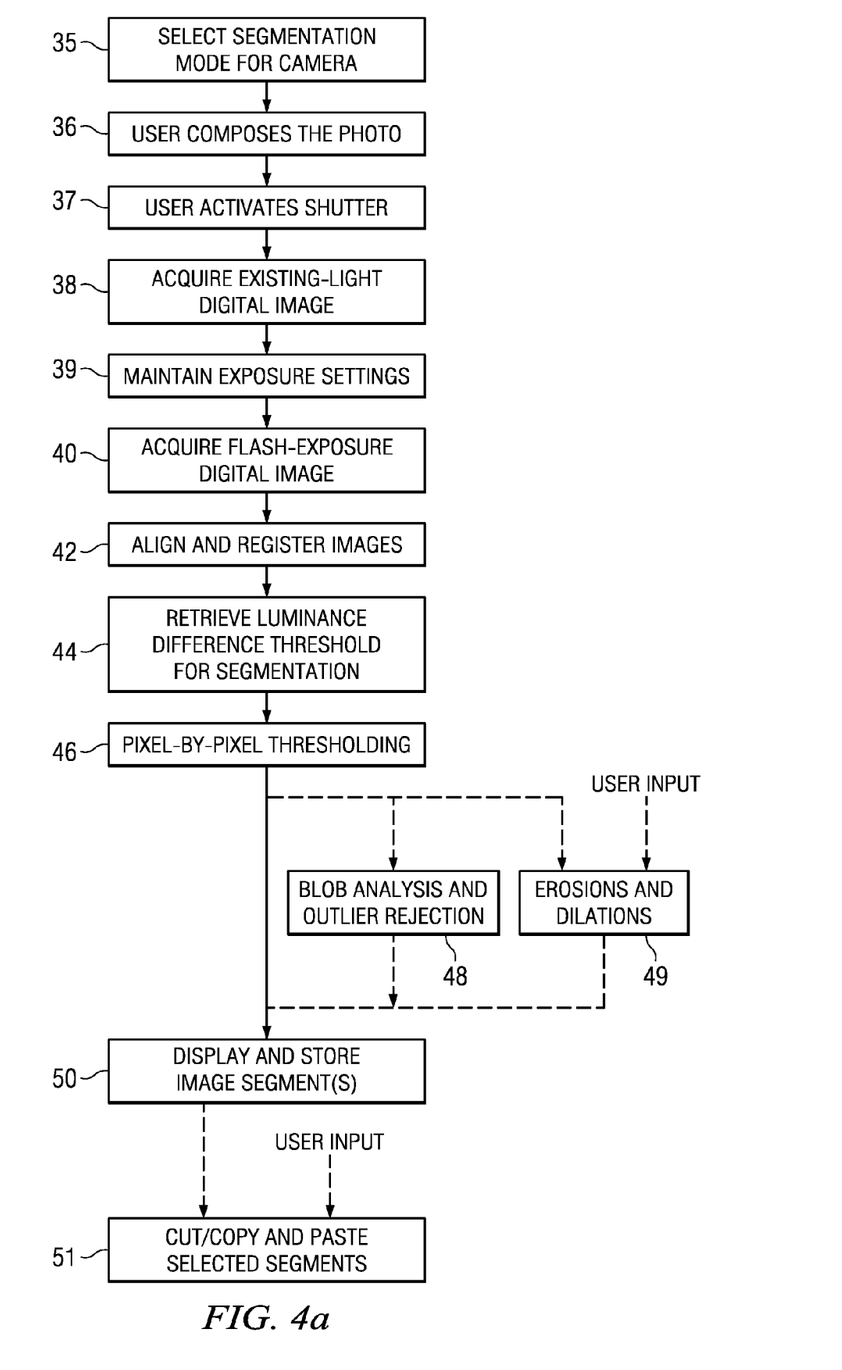
FIGS. 4a through 4c are flow charts illustrating the operation of respective embodiments of the invention.

Referring now to FIG. 4a, the operation of camera phone 20 in acquiring digital images and in segmenting those images to identify and extract foreground subjects from the acquired images, according to an embodiment of the invention, will now be described in detail. In this example, it is contemplated that these functions will be primarily carried out by applications processor 22, executing program instructions retrieved from program memory 25, and in conjunction with the other functions of camera phone 20. It is contemplated that those skilled in the art having reference to this specification can readily realize these functions and operations in the appropriate functional circuitry in the architecture of alternative camera functions and systems. For example, it is contemplated that the operation of this embodiment of the invention can be realized in dedicated digital cameras (i.e., not in a combined system such as a camera phone). In such digital cameras, it is contemplated that the image processing and also the operation of acquiring and applying segmentation to the images according to this invention can be provided with various user-selectable or adjustable options and features, as compared with the relatively simple camera phone implementation described herein. It is contemplated that those skilled in the art having reference to this specification can readily include such options and features in connection with this invention as implemented in such digital cameras, without undue experimentation.

The process begins with process 35, in which the camera user enables the camera function of camera phone 20, and also selects a segmentation mode of operation for this function, for example by way of keypad H in connection with an on-screen menu on display D. Alternatively, the segmentation operation may be selected after the acquisition of images, for example by the user selecting successive images obtained with and without flash. However, it is contemplated that the accuracy and ease of use of the segmentation function according to this embodiment of the invention will be facilitated by the user selection of this function in advance of image acquisition, in process 35 in this example. The user then composes the digital image or photo, in process 36, in the conventional manner. In the context of camera phone 20 (and many digital cameras) that do not have an optical viewfinder, the frame composition of process 36 is performed using display D, once camera phone 20 is in its camera mode. In process 37, the user activates the "shutter" to acquire digital images of the scene, as composed in process 36 in this segmentation mode.

According to this embodiment of the invention, at least two images are acquired of the scene, at different levels of flash exposure. The order in which these images are acquired is not of particular importance according to this invention. In the example of FIG. 4a, camera phone 20 acquires a digital image of the scene without activating LED flash LEDF (i.e., using only the existing ambient light at the scene). As known in the art for modern digital cameras, including those implemented in camera phones such as camera phone 20, the duration over which the light sensor acquires light from the scene (i.e., "shutter speed") is automatically determined based on the sensed available light from the scene prior to activation of the shutter by the user. Conventional automatic exposure functions operate on the assumption that the desired luminance as reflected from the image subject is, on the average, at a "middle" gray tone (e.g., 18%); as such, the shutter speed used to acquire the existing-light image will be that which will result in the average luminance over the frame to equal this middle gray tone. Manual exposure adjustment may be available in some digital cameras, but is not typically provided in camera phones. In process 38, therefore, the existing-light digital image of the scene is captured at this automatic exposure level.

According to this embodiment of the invention, as discussed above, the segmentation of image subjects is based on a difference in luminance of the subject in images obtained at different flash illumination levels. As such, it is useful to maintain the same exposure settings (e.g., shutter speed) so that the difference in luminance can be easily determined. In this example, applications processor 22 stores the exposure settings used in the image acquisition of process 38 in its memory, in process 39, for use in obtaining additional images using flash exposure. Alternatively, it is contemplated that applications processor 22 can be programmed to analyze differences in sensed luminance in the successively obtained images at different flash levels, normalized for the different exposure settings, although this approach is necessarily more complicated.

In process 40, camera phone 20 then acquires a digital image of the scene in conjunction with its activation of LED flash LEDF, to illuminate the subjects in the scene are illuminated with flash. In the context of camera phone 20, LED flash LEDF is typically a relatively weak flash, of limited power, so that the midground and background subjects in the image acquired in process 40 will likely be illuminated to a significantly lesser extent by the flash than will foreground subjects. Alternatively, in higher-capability digital cameras, it may be desirable in this segmentation mode to use, in process 40, a flash power that is somewhat reduced from the full power of the camera flash, so that this desired difference in illumination will occur. Again, as noted above, the segmentation of this embodiment of the invention is facilitated by using in process 40, the same exposure settings used to acquire the image in process 38.

If desired, additional digital images may be acquired beyond these two acquired in processes 38, 40, at different flash levels relative to those used in process 40. However, it is contemplated that two images (e.g., existing-light, and flash-exposed) will be adequate in most cases. In any event, the two or more images captured in processes 38, 40 will be stored in one of the memory resources of camera phone 20, whether in data memory of applications processor 22, in flash memory FM, or in some other resource. As known and conventional in the art, these images can be stored in various forms, including a "raw" format retaining the data values captured by the camera sensor, or in some compressed form (e.g., JPEG) as carried out by applications processor 22 in the conventional manner.

In this example of camera phone 20, the acquisition of images with and without flash in processes 38, 40 is performed in response to a single user activation of the shutter in process 37. Alternatively, the images with and without flash may be acquired in a manual manner, by the user activating the shutter to initiate both of image acquisition processes 38, 40.

Beginning with process 42, applications processor 22 of camera phone 20 begins the segmentation of the images acquired in processes 38, 40 according to this embodiment of the invention. In process 42, applications processor 22 places the acquired images in registration with one another, by way of conventional feature detection algorithms known in the art. It is contemplated that, in many cases, the time interval between the capture of the existing light image and the flash exposure image will be relatively short, and that the user does not change position to any significant extent during that interval. As such, it is contemplated that alignment and registration process 42 can be carried out by relatively rudimentary conventional approaches, considering that the positions of the common features in the acquired images will generally be near to one another within the frame. In the event that the camera position or viewpoint changes sufficiently, over the interval between processes 38, 40, that registration of the images to one another cannot be done (i.e., one or more features are missing from one of the frames), applications processor 22 can issue an error indication on display D, to alert the user to repeat the acquisition of digital images, beginning with composition process 36.

Upon successful registration of the images to one another in process 42, applications processor 22 next retrieves a luminance difference threshold value, in process 44, according to which the automated segmentation of this embodiment of the invention will be performed. According to a relatively simple approach, process 44 can be performed by applications processor 22 retrieving a default or user-preselected threshold value from its memory. Such a default difference threshold may be based on the manufacturer's characterization of typical exposure levels and luminance differences that are expected to be encountered in normal use of the segmentation function. Alternatively, or in addition, this difference threshold may be initially set, or adjusted from a default difference threshold value, by the user of camera phone 20 by way of keypad H and an on-screen menu on display D. If the threshold luminance difference value is to be determined by the user, it is contemplated that camera phone 20 may display a sample image in which the user can select the luminance difference threshold value based on an approximation of the corresponding distance from the camera in the sample image. In this case, it is contemplated that the adjustment or selection of the luminance threshold difference value to be applied may be performed by the user prior to initiation of the segmentation process, for example at or following the selecting of the segmentation function in process 35. Other approaches to the selection or adjustment of the luminance difference threshold value, prior to the capture of the digital images and according to this embodiment of the invention, will be apparent to those skilled in the art having reference to this specification.

Figure 2C:
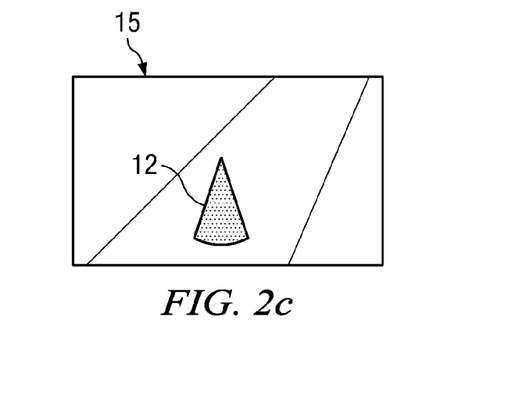

Once the selected luminance difference threshold is retrieved in process 44, applications processor 22 next applies that luminance difference threshold to the acquired images, on a pixel-by-pixel basis, to determine which pixels in the flash-exposed image acquired in process 40 are brighter than the corresponding pixels in the existing-light image acquired in process 38, by more than the retrieved luminance difference threshold value. As described above, this pixel-by-pixel determination will identify those pixels that represent subjects in the foreground of the acquired images, as distinguished from background subjects in those images. Referring to the example of FIGS. 2a and 2b described above, if the selected threshold luminance difference is smaller than the difference in luminance for the pixels representing cone 12 in FIGS. 2a and 2b, but larger than the difference in luminance for the pixels representing cones 12, 14, then the pixel-by-pixel determination of process 44 can identify cone 12 as a foreground object. An image segment can then be readily defined based on those pixels for which the luminance difference (FIG. 2b relative to FIG. 2a) exceeds the threshold luminance difference, using the sensed luminance (and chrominance) for those pixels from one of the captured images; the other pixels representative of background objects are ignored. In this example, where the selected threshold luminance difference distinguishes cone 12 from cones 14, 16, the image segment corresponding to cone 12 only, without pixels corresponding to cones 14, 16, is illustrated in FIG. 2c, for example using the sensed pixel luminance and chrominance from the existing-light image of FIG. 2a for this foreground subject.

It has been observed, in connection with this invention, that the luminance of pixels at different levels of flash exposure is not strongly affected by the color of the subject itself. In other words, it has been observed that the luminance of black foreground image subjects will sufficiently differ between the existing-light and flash-exposed images that a relatively simple sensing and thresholding approach can be used. This ability to distinguish between subjects of different color at different distances, for example to distinguish between a black foreground subject and a white or highly-reflective midground subject, is also facilitated in modern digital camera functions by the use of RGB light sensors of "enhanced LUX" sensitivity. Such modern RGB sensors include the ability to directly sense broadband light frequencies, beyond the ability to sense light that is filtered or limited to the red, green, and blue bands. In addition, these sensors can sense ultra-violet light (i.e., light outside the visible bands), which further enable distinguishing subjects in an image according to embodiments of this invention.

In some cases, it is possible that one or more pixels in the captured images may have a luminance difference that exceeds the threshold luminance difference value, but may not correspond to a foreground subject. For example, a corner of an object in the background may be particularly reflective of flash light. As known in the art, energy reflected from a point on an object depends on such factors as the reflectivity of the material of the object, and also upon the angle of incidence of light relative to the normal from the surface of the object. As a result, there may be features, edges, or corners of objects in the image that strongly reflect light from the camera flash, and thus present a high luminance value in the flash-exposed image, but that do not exhibit a strong reflected luminance in the existing light image. According to this embodiment of the invention, referring back to FIG. 4a, "blob" analysis and outlier rejection process 48 can optionally be implemented or performed to eliminate such spurious pixels from the segmented foreground subject.

As known in the digital image processing art, the term "blob" refers to a "binary large object" made up of a relatively large region of a digital image, in which adjoining pixels have a common attribute such as luminance, chrominance (color), and the like. Blob analysis and outlier rejection process 48, according to this embodiment of the invention, can be realized by way of a conventional spatial image processing software routine stored in program memory 25. In this implementation, this software routine is executed by applications processor 22 on the results of thresholding process 46, to distinguish larger areas of pixels with a high luminance difference from smaller areas and individual pixels that also exhibit a high luminance difference. The larger areas, or perhaps any area greater than a preselected threshold area, are retained as foreground subjects, while the smaller areas ("outlier pixels") are ignored or otherwise precluded from the segmentation. As a result of blob analysis and outlier rejection process 48, when implemented and executed, the fidelity of thresholding process 46 in identifying foreground subjects of the captured digital images can be improved.

Other optional image processes can be performed after thresholding process 46, in addition to or without blob analysis and outlier rejection process 48. In optional erosion and dilation process 49 according to this embodiment of the invention, the image segment or segments identified in thresholding process 46 can be further distinguished and enhanced. In this example, process 49 can receive inputs from the user selecting one or more of the identified foreground segments, if more than two such segments are identified. To perform morphological erosions in process 49, applications processor 22 executes a software routine to eliminate subjects other than the selected subject, for example those that are not horizontally adjacent or connected to the selected subject, discarding those eliminated subjects from the retained image and improving the selection originated by thresholding process 46 (and user selection). Process 49 also performs morphological dilation to improve the fidelity of the desired foreground subject, considering that sides of the image subject will not reflect flash light as strongly as the front surface. Dilations are carried out by applications processor 22 executing a software routine to dilate, or expand the size of, the selected segment using an image attribute other than luminance difference. For example, the selected segment can be dilated to include those adjacent or nearby pixels that represent a texture consistent with that represented by the pixels satisfying thresholding process 46. Such dilation will ensure that the segment better represents the foreground subject. It is therefore contemplated that optional erosion and dilation process 49 will result in improvement in the representation of the identified foreground subject.

The identified pixels having a luminance difference exceeding the threshold luminance difference value (and as may be further distinguished by optional blob analysis and outlier rejection process 48, by optional erosion and dilation process 49, or both, or other optional processing) are then available for use as a segmented image corresponding to one or more foreground subjects. In process 50, applications processor 22 in camera phone 20 manages these one or more foreground image segments for later use by the user. In any event, process 50 includes the retrieval of the pixel luminance and chrominance data from one of the images captured in processes 38, 40 (e.g., from the existing light image, assuming it was adequately and properly exposed), for those pixels identified in processes 46, 48 as corresponding to a foreground subject. In this example, process 50 also includes the display of the retrieved pixel data for the segmented foreground subjects on display D of camera phone 20, so that the user can view the results of the foreground segmentation (and delete the images if the segmentation or exposure is not acceptable). Also in process 50, applications processor 22 manages the storage of the identified foreground segments (as well as the entire captured image or images) in a memory resource, for example flash memory FM of camera phone 20, so that the user can download the captured image and its identified foreground segments for later processing and use.

Optionally, camera phone 20 may include the ability to further utilize the selected segment, according to this embodiment of the invention. For example, as shown in FIG. 4a, process 51 may be performed, in response to user selection and input, to cut or copy, and then paste, one or more of the identified segments into an existing image. The segment may be pasted to a different (or additional, if copied) location of the same image from which it was cut or copied, or pasted into a different image currently stored in flash memory FM or elsewhere in camera phone 20. As such, optional process 51 provides the ability for a wide range of creative options on the part of the user.

This embodiment of the invention was described in connection with the segmentation of foreground subjects from a captured digital image, by selecting those pixels having a luminance difference exceeding a threshold luminance difference value. It is also contemplated that this invention can be used to identify and segment subjects in the background of a captured digital image, by identifying those pixels that have a luminance difference less than the threshold luminance difference value. Of course, in this case, additional image processing will be required to fill in the "hole" left in the resulting image by the removal of the foreground subjects.

As evident from the foregoing description, the extent to which the foreground and background subjects are distinguished from one another, and more specifically the determination of whether midground subjects are also segmented along with foreground subjects, depends on the luminance difference threshold. According to another embodiment of the invention, the selection of the desired threshold luminance difference value is performed by iterative processing and thresholding of the pixels in the captured images, and by user input and selection based on the results of that iterative processing, as will now be described in connection with FIG. 4b in combination with FIGS. 1, 5a, and 5b.

Figure 4B:
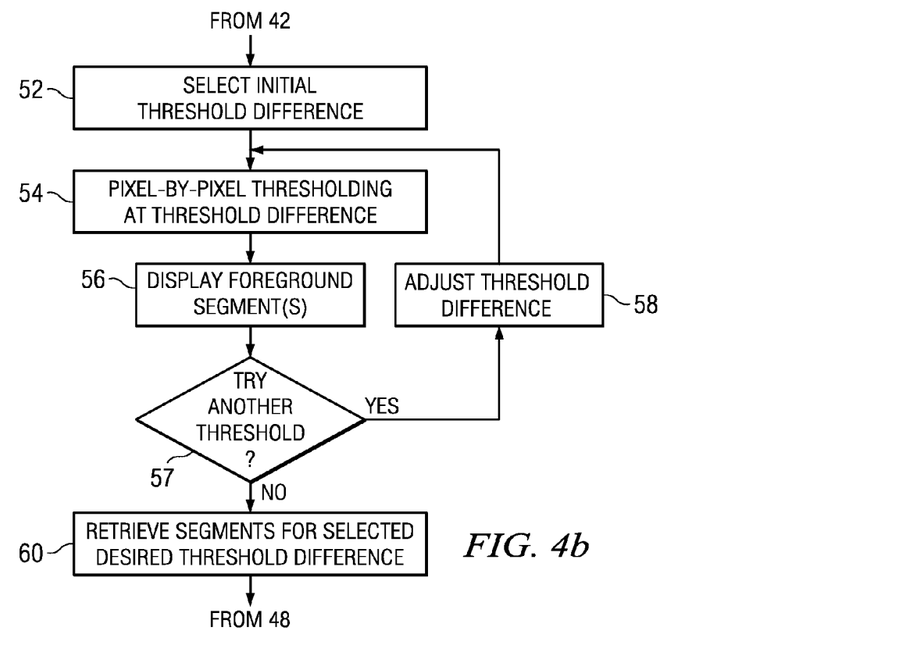

As discussed above, the scene of FIG. 1 within field of view 5 and from the point of view of camera phone 20, includes toy 2 on shelf 3 as a foreground subject, flowerpot 4 on shelf 7 in the midground, and framed picture 6 in the background. Digital images of this scene are obtained at two different flash illumination levels, such as existing-light and normal flash exposure, as described above in connection with the first embodiment of the invention. After these images are aligned and placed in registration with one another (process 42), the selection of the desired threshold luminance difference value then commences, according to this embodiment of the invention as shown in FIG. 4b, as will now be described.

In process 52, an initial threshold luminance difference value is selected. This initial value may be a default value stored in the memory of camera phone 20, or alternatively may be selected by the user before or in conjunction with the selection of the segmentation mode (process 35) or selected by the user at this stage of the process. In process 54, applications processor 22 then applies this initial threshold luminance difference value to the images of the scene captured in processes 38, 40, in the manner described above in connection with process 46. As discussed above, this process 54 determines the difference in luminance of each pixel in the captured images, and compares that difference with the initial threshold luminance difference value to identify those pixels having a luminance difference exceeding the initial threshold luminance difference value. In process 56, applications processor 22 forwards, to display D, luminance and chrominance data from one of the images captured in processes 38, 40 (e.g., the existing light image captured in process 38), for those pixels identified by thresholding process 54. In process 56, display D thus presents, to the user, those image segments that are considered as foreground subjects of the image for the initial threshold luminance difference value.

Figure 5A:
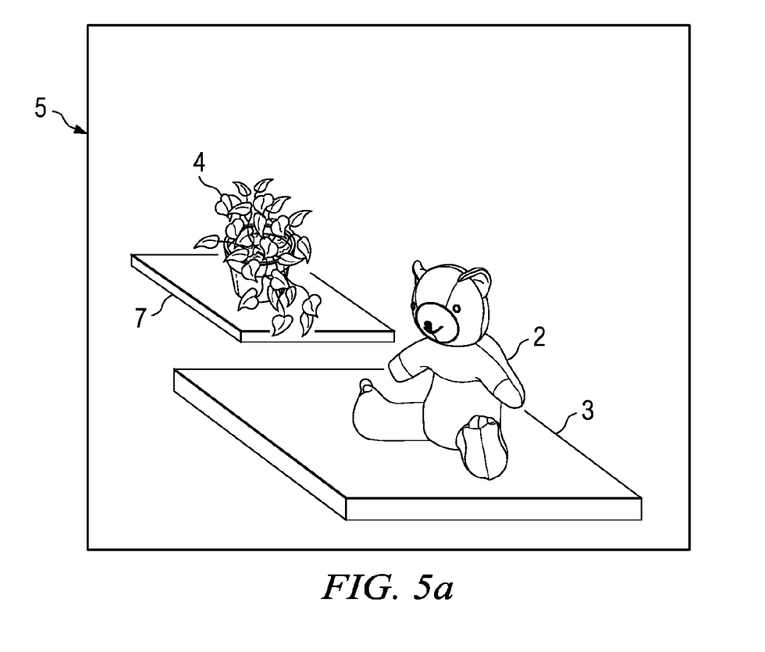
FIGS. 5a and 5b are views of the digital image of FIG. 1 as acquired and segmented at different threshold luminance difference values, according to an embodiment of the invention.

FIG. 5a illustrates an example of such a displayed image resulting from process 56. In this case, the threshold luminance difference value was at a level sufficiently low that both toy 2 and flowerpot 4 (and their respective shelves 3, 7) were segmented out as foreground objects; framed picture 6 was sufficiently far in the background (i.e., its reflected light in the flash exposure of process 40 was sufficiently weak) that its corresponding pixels did not exhibit a sufficient luminance difference to exceed the threshold luminance difference value.

Figure 5B:
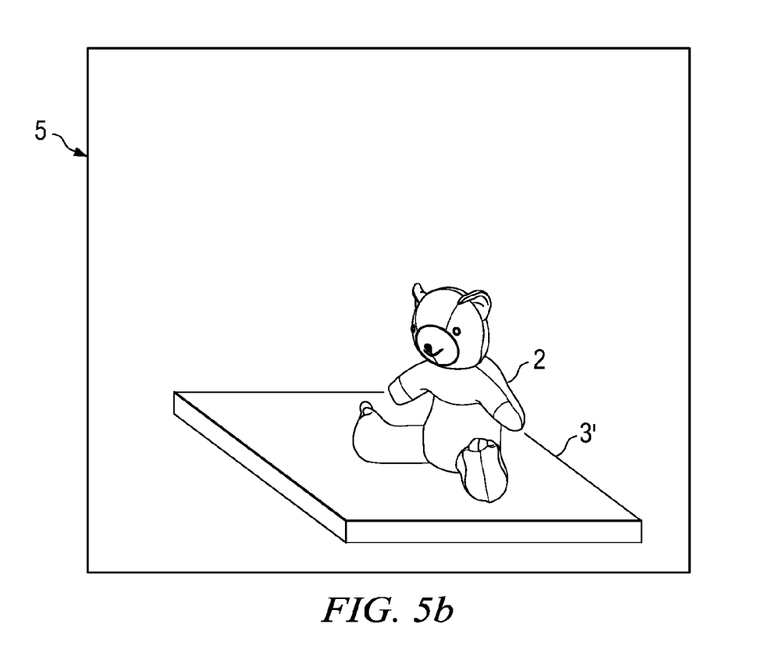

The user then determines, in decision 57, whether a different threshold luminance difference value ought to be tried. If so (decision 57 is YES), the threshold luminance difference value is adjusted in process 58. This adjustment of the threshold luminance difference value may be an automatic adjustment (e.g., incrementing in pre-defined steps from a minimum difference), or alternatively may be user-selected, for example by way of a jog dial on camera phone 20 or by way of keypad H. Upon the adjustment of the threshold luminance difference value, processes 54, 56 and decision 57 are repeated. FIG. 5b illustrates, for example, the result of a repeated instance of process 56 at a higher threshold luminance difference value than that used to create the image in FIG. 5a, by way of example. As shown in FIG. 5b, flowerpot 4 and its shelf 7 are no longer in the image, as the luminance difference of those pixels fell below the increased adjusted threshold luminance difference value used in the instance of process 56 that created the image of FIG. 5b. Indeed, in FIG. 5b, the threshold luminance difference value is sufficiently high that toy 2 and modified shelf 3' are the only features appearing, where modified shelf 3' is only the closer portion of shelf 3 in the original image (FIG. 1).

Alternatively, process 54 may be performed for each of the available threshold luminance difference values prior to the display of any one of the foreground segments in process 56, following which process 56 is performed for a selected one of the threshold luminance difference values. In this approach, the selection of a different threshold luminance difference value would result only in the display of the corresponding segments for that difference value in process 56. This would allow the user to rapidly scroll through displays of the available segmentation thresholds (e.g., viewing the images of FIGS. 1, 5a, and 5b), using display D and a jog dial or other control.

Upon all desired or available threshold luminance difference values having been used (decision 57 is NO), the user then selects the desired threshold luminance difference value, and the identified foreground image segments are retrieved in process 60. Control then passes to processes 48, 49 (if implemented), or to process 50 for the display and storage of the resulting identified foreground segments.

Figure 4C:
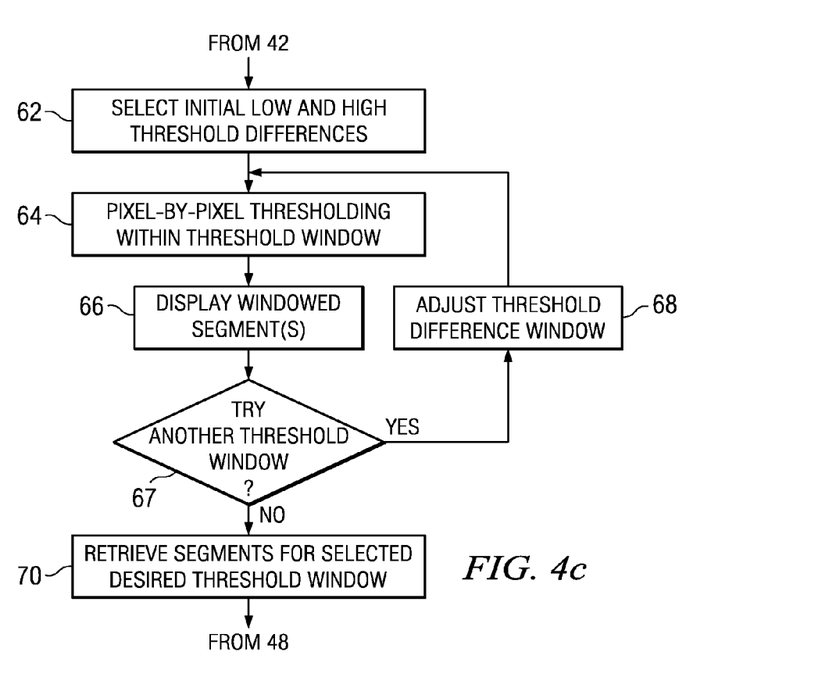

Further in the alternative, camera phone 20 may be constructed so that the user can select a segment corresponding to a midground subject, specifically a subject that is between the foreground and background, while excluding foreground subjects from the desired segment. FIG. 4c illustrates an alternative embodiment of the invention for selecting one or more subjects from a captured digital image, for selecting such midground or other subjects without being constrained to the foreground.

Again, as described above, two images are captured at different flash illumination levels, such as existing-light and normal flash exposure; preferably these images are captured automatically, in rapid succession, following a single shutter press by the user. The captured images are stored, compressed (if desired), aligned and placed in registration with one another as described above (through process 42 of FIG. 4a, for example). In the alternative to selecting a threshold luminance difference value as in FIG. 4b, according to this alternative embodiment of the invention a threshold luminance difference window is selected, to facilitate the selection of a specific subject within the captured images.

In process 62, low and high initial threshold luminance difference values are selected, defining an initial threshold luminance difference window. As before, process 62 may retrieve this initial window from the memory of camera phone 20, or alternatively the user may select or configure the initial low and high threshold luminance difference values individually. According to this embodiment of the invention, the low threshold luminance difference value effectively corresponds to the farthest distance (from the point of view of camera phone 20) of a candidate subject in the images, and the high threshold luminance difference value corresponds to the nearest distance of the candidate subject. In process 64, applications processor 22 executes a routine by way of which this initial threshold luminance difference window is applied in a pixel-by-pixel manner to the images captured in processes 38, 40 to identify those pixels with a luminance difference value within the current window. The luminance and chrominance data from one of the images captured in processes 38, 40, for the pixels identified in thresholding process 64, are then forwarded by applications processor 22 to display D at which those image segments are displayed to the user, in process 66.

In this embodiment of the invention, the user can adjust or select the luminance difference window to capture the desired subject in the captured image. As such, in decision 67, the user decides whether a different threshold luminance difference window is to be selected, in response to the segments displayed in process 66. It is contemplated that, in most implementations, the user will not be called upon to select specific absolute luminance values as the low and high values. Rather, it is contemplated that the user will instead qualitatively adjust the windowing values (i.e., low and high threshold luminance difference values) by way of a scrolling input device, such as a jog dial, roller, touch screen input, or the like. If the user selects a different value (decision 67 is YES), the threshold luminance difference window is adjusted in process 68, for example as a simultaneous adjustment of both the low and high difference threshold values (with the two values maintaining some preselected absolute or relative relationship to one another, for user-friendliness). Processes 64, 66 and decision 67 are then repeated.

Alternatively, as in the embodiment described above relative to FIG. 4b, thresholding process 64 may be performed for each of the available threshold luminance difference windows prior to the first instance of display process 66, such that any change in the threshold luminance difference window selected by the user in decision 67 will merely change the particular segments that are displayed for the selected difference window in process 566.

In either case, it is contemplated that the thresholding and display process according to this embodiment of the invention will be executed by applications processor 22 sufficiently rapidly that the user can rapidly scroll through the potential window values to quickly select the image segments desired. Once the user makes the final selection of the desired subject either implicitly by selecting the desired threshold luminance difference window, or explicitly by selecting a subject in the image using a cursor or touch screen input, (decision 67 is NO), the identified image segment or segments are retrieved in process 70. Control then passes to optional processes 48, 49 (if implemented), or to process 50 for the display and storage of the resulting identified segments, as before.

According to these embodiments of the invention as described relative to FIGS. 4b and 4c, the computational power of applications processor 22 in camera phone 20 is used in an interactive fashion in the selection of the threshold luminance difference value that provides the desired segmentation results for a particular image. These alternative embodiments of the invention would be useful in many instances, considering that the relative distance between the foreground and midground subjects can vary from scene to scene, and can vary with the absolute distance of the subjects from the point of view of the camera.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A segmentation method for identifying one or more subjects in a digital image according to distance, comprising the steps of:
    capturing a first digital image of a scene including first and second subjects at different distances from the point of view of the captured image, at a first flash exposure level;
    capturing a second digital image of the scene including the first and second subjects, at a second flash exposure level different from the first flash exposure level;
    determining a luminance difference for pixels corresponding to the first and second subjects, between the first and second digital images; and
    identifying those pixels having a luminance difference relative to a threshold luminance difference value, as pixels corresponding to the first subject;
    wherein the identifying step comprises:
    comparing the luminance difference for each pixel with the threshold luminance difference value;
    grouping pixels having a similar luminance difference as one another, relative to the threshold luminance difference value, and that are in proximity with one another;
    identifying outlier pixels that have a luminance difference similar to the grouped pixels, relative to the threshold luminance difference value, but that are not in proximity to a large group of pixels having a similar luminance difference as one another;
    identifying pixels corresponding to the first subject as the grouped pixels, excluding the outlier pixels.

2. The method of claim 1, wherein the first subject is a foreground subject and the second subject is a background subject;
    and wherein the identifying step identifies those pixels having a luminance difference exceeding the threshold luminance difference value.

3. The method of claim 1, wherein the first flash exposure level corresponds to no flash light, such that the first digital image is captured using existing light from the scene.

4. The method of claim 1, further comprising:
    after the capturing step, aligning the digital images relative to one another so that pixel positions in each of the first and second images corresponds to the same ones of the first and second subjects.

5. The method of claim 1, further comprising:
    storing an image comprising the pixels corresponding to the first subject, the stored image not including the pixels corresponding to the second subject.

6. The method of claim 1, wherein the steps of capturing the first digital image and of capturing the second digital image are performed by a digital camera at the same exposure settings.

7. The method of claim 1, further comprising, prior to the identifying step:
    selecting the threshold luminance difference value.

8. The method of claim 7, wherein the step of selecting the threshold luminance difference value comprises:
    retrieving a candidate threshold luminance difference value;
    identifying those pixels having a luminance difference exceeding the initial candidate threshold luminance difference value;
    displaying, to a user, an image including the identified pixels;

repeating the performing, identifying, and displaying steps for at least one additional candidate threshold luminance difference value; and receiving a user input indicating the desired threshold luminance difference value.

9. The method of claim 1, further comprising:

obtaining pixel data corresponding to the first subject from one of the first and second digital images; and pasting an image portion corresponding to the obtained pixel data into a digital image.

10. The method of claim 1, further comprising:

after the identifying step, performing an erosion of a digital image relative to the pixels corresponding to the first subject, to eliminate pixels corresponding to other subjects in the digital image.

11. The method of claim 1, further comprising:

after the identifying step, performing a dilation of a digital image relative to the pixels corresponding to the first subject, to include adjacent pixels to the identified pixels according to an image attribute.

12. A segmentation method for identifying one or more subjects in a digital image according to distance, comprising the steps of:

capturing a first digital image of a scene including first, second, and third subjects at different distances from the point of view of the captured image, at a first flash exposure level, wherein the first subject is a foreground subject, the second subject is a background subject, and the third subject is a midground subject;

capturing a second digital image of the scene including the first, second, and third subjects, at a second flash exposure level different from the first flash exposure level; and selecting a midground subject corresponding to pixels having a luminance difference between the first and second digital images by:

determining a luminance difference for pixels corresponding to the first, second, and third subjects, between the first and second digital images; and identifying those pixels having a luminance difference exceeding a low threshold luminance difference value and less than a high threshold luminance difference value, as pixels corresponding to the third subject.

13. The method of claim 12, wherein the selecting step further comprises:

retrieving an initial low threshold luminance difference value and an initial high threshold luminance difference value, the initial low and high luminance difference values defining an initial candidate threshold luminance difference window;

after the determining step, identifying those pixels having a luminance difference within the initial candidate threshold luminance difference window; displaying, to a user, an image including the identified pixels;

repeating the identifying and displaying steps for at least one additional candidate threshold luminance difference window; and receiving a user input indicating the desired threshold luminance difference window.

14. An electronic system, comprising:

camera hardware, including a lens and electronic shutter;

a camera flash;

circuitry for controlling the electronic shutter and camera flash in capturing a digital image;

processor circuitry for processing digital data corresponding to images acquired via the camera hardware;

program memory, for storing software instructions that, when executed by the processor circuitry, cause the processor circuitry and controlling circuitry to perform a sequence of operations comprising:

causing the camera hardware and camera flash to capture a first digital image of a scene including first and second subjects at different distances from the point of view of the captured image, at a first flash exposure level;

causing the camera hardware and camera flash to capture a second digital image of the scene including the first and second subjects, at a second flash exposure level different from the first flash exposure level;

determining a luminance difference for pixels corresponding to the first and second subjects, between the first and second digital images; and identifying those pixels having a luminance difference relative to a threshold luminance difference value as pixels corresponding to the first subject;

wherein the operation of identifying those pixels having a luminance difference exceeding a threshold luminance difference value as pixels corresponding to the first subject comprises:

comparing the luminance difference for each pixel with the threshold luminance difference value;

grouping pixels having a similar luminance difference as one another, relative to the threshold luminance difference value, and that are in proximity with one another;

identifying outlier pixels that have a similar luminance difference as the grouped pixels, relative to the threshold luminance difference value, but that are not in proximity to a large group of pixels having a similar luminance difference as one another;

identifying pixels corresponding to the first subject as the grouped pixels, excluding the outlier pixels.

15. The system of claim 14, wherein the operation of causing the camera hardware and camera flash to capture a first digital image of a scene comprises:

controlling the camera hardware to capture the first digital image; and controlling the camera flash to remain off during the operation of controlling the camera hardware to capture the first digital image.

16. The system of claim 15, wherein the operation of causing the camera hardware and camera flash to capture a second digital image of the scene comprises:

controlling the camera hardware to capture the second digital image; and activating the camera flash during the operation of controlling the camera hardware to capture the second digital image.

17. The system of claim 14, wherein the operation of causing the camera hardware and camera flash to capture a first digital image of a scene is performed prior to the operation of causing the camera hardware and camera flash to capture a second digital image of the scene.

18. The system of claim 14, wherein the sequence of operations further comprises:

after the operation of causing the camera hardware and camera flash to capture a second digital image of the scene, aligning the digital images relative to one another so that pixel positions in each of the first and second images correspond to the same ones of the first and second subjects.

19. The system of claim 14, further comprising:

a memory resource; and interface circuitry coupling the processor circuitry to the memory resource;

and wherein the sequence of operations further comprises:
 storing, in the memory resource, an image comprising the pixels corresponding to the first subject, the stored image not including the pixels corresponding to the second subject.

20. The system of claim 14, wherein the sequence of operations further comprises selecting the threshold luminance difference value, prior to the identifying operation;

and wherein the sequence of operations further comprises:
 retrieving an initial threshold level;
 identifying those pixels having a luminance difference exceeding the initial candidate threshold luminance difference value;
 displaying, to a user, an image including the identified pixels;
 repeating the performing, identifying, and displaying steps for at least one additional candidate threshold luminance difference value; and
 receiving a user input indicating the desired threshold luminance difference value.

21. An electronic system, comprising:
camera hardware, including a lens and electronic shutter;
a camera flash;
circuitry for controlling the electronic shutter and camera flash in capturing a digital image;
processor circuitry for processing digital data corresponding to images acquired via the camera hardware;
program memory, for storing software instructions that, when executed by the processor circuitry, cause the processor circuitry and controlling circuitry to perform a sequence of operations comprising:
causing the camera hardware and camera flash to capture a first digital image of a scene including a plurality of subjects at different distances from the point of view of the captured image, at a first flash exposure level, wherein a first subject is a foreground subject, a second subject is a background subject, and a third subject is a midground subject;
causing the camera hardware and camera flash to capture a second digital image of the scene including the plurality of subjects, at a second flash exposure level different from the first flash exposure level; and
selecting a midground subject corresponding to pixels having a luminance difference between the first and second digital images by:
determining a luminance difference for pixels corresponding to the plurality of subjects, between the plurality of digital images;
retrieving an initial low threshold luminance difference value and an initial high threshold luminance difference value, the initial low and high luminance difference values defining an initial candidate threshold luminance difference window;
identifying those pixels having a luminance difference within the initial candidate threshold luminance difference window;
displaying, to a user, an image including the identified pixels;
repeating the identifying and displaying steps for at least one additional candidate threshold luminance difference window; and
receiving a user input indicating the desired threshold luminance difference window, to identify pixels corresponding to the third subject.

22. The system of claim 14, further comprising:
an antenna;
an RF module coupled to the processor circuitry and to the antenna, for transmitting and receiving electrical signals via the antenna;
a microphone;
a speaker;
an audio codec, coupled to the processor circuitry and to the microphone and speaker, for interfacing the processor circuitry to the microphone and speaker so that audio input received at the microphone is forwarded as signals to the processor circuitry, and so that signals from the processor circuitry are driven as audio output from the speaker.

* * * * *